United States Patent
Onishi et al.

(10) Patent No.: US 7,468,408 B2
(45) Date of Patent: Dec. 23, 2008

(54) FLAME-RETARDANT STYRENE RESIN COMPOSITION

(75) Inventors: Hideaki Onishi, Otsu (JP); Makoto Teramoto, Urayasu (JP)

(73) Assignee: Dai-Ichi Kogyo Seiyaku Co., Ltd., Kyoto-Shi (JP)

(*) Notice: Subject to any disclaimer, the term of this patent is extended or adjusted under 35 U.S.C. 154(b) by 154 days.

(21) Appl. No.: 10/590,723

(22) PCT Filed: Jan. 11, 2005

(86) PCT No.: PCT/JP2005/000167

§ 371 (c)(1),
(2), (4) Date: Aug. 25, 2006

(87) PCT Pub. No.: WO2005/082997

PCT Pub. Date: Sep. 9, 2005

(65) Prior Publication Data

US 2007/0173569 A1    Jul. 26, 2007

(30) Foreign Application Priority Data

Feb. 26, 2004 (JP) ............................. 2004-050844
Mar. 25, 2004 (JP) ............................. 2004-088232

(51) Int. Cl.
*C08K 5/48* (2006.01)
(52) U.S. Cl. .................... 524/88; 524/133; 524/135; 524/140; 524/141; 524/577; 524/578
(58) Field of Classification Search .................. 524/88, 524/133, 135, 140, 141, 577, 578
See application file for complete search history.

(56) References Cited

U.S. PATENT DOCUMENTS

| | | | |
|---|---|---|---|
| 3,775,149 A | 11/1973 | Langley et al. | |
| 3,825,520 A * | 7/1974 | Parts et al. | 524/88 |
| 3,850,882 A | 11/1974 | Underwood et al. | |
| 4,027,080 A | 5/1977 | Amtmann et al. | |
| 5,124,391 A | 6/1992 | Muehlbach et al. | |
| 5,753,717 A | 5/1998 | Sanyasi | |

FOREIGN PATENT DOCUMENTS

| | | |
|---|---|---|
| JP | 05-247292 A | 9/1993 |
| JP | 11-001589 A | 1/1999 |
| JP | 2001-139758 A | 5/2001 |
| JP | 2002-128976 A | 5/2002 |
| JP | 2003-105093 A | 4/2003 |

OTHER PUBLICATIONS

Abstract of JP 02-212525A, Aug. 23, 1990.
Written Opinion of the International Searching Authority for International Application No. PCT/JP2005/000167.
International Search Report for PCT*JP2005/000167 dated Mar. 29, 2005.

* cited by examiner

*Primary Examiner*—Bernard Lipman
(74) *Attorney, Agent, or Firm*—Millen, White, Zelano & Branigan, P.C.

(57) ABSTRACT

Disclosed is a flame retarded styrene-based resin composition containing a brominated flame retardant and an additive capable of enhancing the flame retardancy of the shaped article of the composition even in a very small amount of addition. The composition comprises (A) a styrene-based resin, (B) 0.1 to 30 parts by weight per 100 parts by weight of the resin (A) of a brominated flame retardant having a bromine content greater than 50 wt %, and (C) 0.01 to 0.2 parts by weight per 100 parts by weight of the resin (A) of a metal phthalocyanine selected from iron, manganese, cobalt, nickel, platinum or paradium phthalocyanine.

21 Claims, No Drawings

FLAME-RETARDANT STYRENE RESIN COMPOSITION

FIELD OF THE INVENTION

This invention relates to a flame-retarded styrene-based resin composition for fabricating shaped plastic articles used in the application field requiring flame retardancy. Specifically, it relates to a flame-retarded styrene-based resin composition comprising the resin, a brominated flame retardant and a minor amount of a phthalocyanine-metal complex effective to enhance the flame retardancy of the brominate flame retardant so that higher flame retardancy levels may be obtained with a relatively small amount of the brominated flame retardant.

BACKGROUND PRIOR ART

Styrene-based resin have excellent water-resistance, mechanical strength and moldability and used in many application fields as parts of household and office appliances as well as construction materials. The material used in such application fields must pass a flame retardancy standard established for each application field. These standards have become severer for safety reason against fire. For example, the regulation under the UL standard (Underwriters Laboratories, U.S.A.) for household and office electrical appliances has become more stringent in recent years.

Flammable styrene-based resins need be flame-retarded in a variety of ways under these circumstances. Most practical and effective way is, among others, to incorporate a brominated flame retardant.

It may be possible to pass the stringent flame retardancy standard by increasing the amount of brominated flame retardant to be added to the resin. However, this approach is not only uneconomical but may adversely affect the generation of harmful gas and the mechanical properties. It is desirable to render the resin flame-retarded with as small as possible amount of the flame retardant.

We have found that certain phthalocyanine-metal complexes enhance the flame retardancy of a brominate flame retardant (a flame retardant containing at least 50 wt % of bromine). It has been proposed in the past to incorporate a phthalocyane-metal complex to flammable plastics in conjunction with the brominate flame retardant for different purposes.

For example, JP2000/239461A discloses addition of phthalocyane blue (copper phthalocyanine) to flame-retarded polypropylene as a blue colorant. U.S. Pat. No. 3,825,520 discloses that when a metal (Fe, Cu, Mn, V and Co) phthalocyanine is incorporated to flame-retarded polystyrene or ABS composition containing octabromobiphenyl, smoking of the composition during burning is reduced. JP 9/255879A teaches that when adding ultrafine particles of a metal coordination compound, thermoplastics including polystyrene may be rendered flame-retarded effectively with a small addition of a flame retardant. However, phthalocyanine is not disclosed as the ligand of the coordination compound.

DISCLOSURE OF THE PRESENT INVENTION

In order to impart a resin composition with higher flame retardancy, it is desirable to reduce the amount of a flame retardant to be added to the resins as small as possible by combining a very small amount of an additive capable of enhancing the flame retardancy of the flame retardant, rather than increasing the flame retardant itself. This is because increased amounts of the flame retardant may, as discussed above, increase generation of harmful gas and deteriorate the mechanical properties of the resin proportionally to the amount of the flame retardant. The object of the present invention is to provide such an additive capable of enhancing the flame retardancy of a brominate flame retardant when used in combination.

According to the present invention, there is provided a flame-retarded styrene-based resin composition comprising:
 (A) a styrene-based resin;
 (B) 0.1 to 30 parts by weight per 100 parts by weight to (A) of a brominated flame retardant having a bromine content greater than 50 wt %; and
 (C) 0.01 to 0.2 parts by weight per 100 parts by weight of (A) of a metal phthalocyanine selected from iron, manganese, cobalt, nickel, platinum or paradium phthalocyanine.

The composition may further comprise a phosphorus flame retardant having a phosphorus content greater than 5 wt %. The amount thereof is 0.1 to 20 parts by weight per 100 parts of (A).

BEST MODE FOR CARRYING OUT THE INVENTION (1) Styrene-Based Resin:

The term "styrene-based resin" as used herein refers to homo- or copolymers of styrene or styrene derivatives such as vinyl toluene or α-methylstyrene. The homo- or copolymer may contain a minor proportion of other monomers copolymerizable with styrene, e.g. butadiene, acrylonitrile, methyl methacrylate, maleic anhydride and itaconic acid. Also included in the styrene-based resin is high impact strength polystyrene known as HIPS. Polystyrene and HIPS are typical. The styrene-based resin may contain up to 30 wt % of an olefinic resin such as polyethylene, polypropylene and ethylene-propylene copolymer.

(2) Brominated Flame Retardant:

A number of brominated flame retardants having a bromine content greater than 50 wt % are known in the art. Examples thereof include:
hexabromocyclododecane,
tetrabromocyclooctane,
bis(pentabromophenyl)ethane,
bis(2,4,6-tribromophenoxyl)ethane,
ethylene-bis(tetrabromophathalimide),
hexabromobenzene,
pentabromotoluene,
poly(dibromophenyl)ether,
tris(2,3-dibromopropyl)isocyanurate,
tribromophenol,
tribromophenyl allyl ether,
tribromoneopentyl alcohol.
tetrabromobisphenol A,
tetrabromobisphenol S,
tetrabromobisphenol A carbonate oligomer,
tetrabromobisphenol A bis(2-hydroxyethyl)ether,
tetrabromobisphenol A bis(2,3-dibromopropyl)ether.
tetrabromobisphenol A bis(2,3-dibromoisobutyl)ether,
tetrabromobisphenol A diallyl ether,
tetrabromobisphenol S bis(2,3-dibromopropyl)ether,
tetrabromobisphenol A dimethallyl ether,
octabromotrimethylphenylindane,
poly(pentabromobenzyl acrylate),
brominated polystyrene,
brominated polyethylene,
brominated polycarbonate,
perbromocyclopentadecane, tris(2,3-dibromopropyl)phosphate,
tris(2,3-dibromochloropropyl)phosphate,
tris(tribromoneopentyl)phosphate,
bis(2,3-dibromopropyl)-2,3-dichloropropyl phosphate, etc.

While the amount of brominated flame retardant may vary depending upon the bromine content of particular flame retardants, the desired level of flame retardancy, the type of styrene resin or other factors, it is generally 0.1 to 30 parts by weight, preferably 0.5 to 20 parts by weight, especially 1 to 15 parts by weight per 100 parts by weight of the resin. Naturally the flame retardancy increases proportionally to the amount of brominated flame retardant with decrease in the mechanical properties. Thus an optimum balance between the flame retardancy and the mechanical properties is very important.

(3) Metal Phthalocyanine:

The present invention employs a phthalocyanine complex with a metal selected from the group consisting of iron, manganese, cobalt, nickel, platinum and paradium. Other metal phthalocyanines such as copper phthalocyanine do not significantly enhance the flame retardancy of the brominated flame retardant. Chromium and cadmium phthalocyanines are unacceptable for ecological reasons. Iron, cobalt and nickel phthalocyanines are preferable for their availability. Corresponding halogenated metal phthalocyanines may also be used.

The amount of metal phthalocyanines of the above class is generally 0.01 to 0.2 parts by weight, preferably 0.05 to 0.15 parts by weight per 100 parts of the resin.

(4) Phosphorus Flame Retardant:

While not essential, a phosphorus flame retardant may be combined with the brominated flame retardant. The combined use of the phosphorus flame retardant has an effect of decreasing the amount of the brominated flame retardant to achieve the desired flame retardancy and an effect of, depending on particular phosphorus flame retardants, plasticizing the styrene-based resin adequately. The phosphorus flame retardants usable for these purposes are those having a phosphorus content greater than 6 wt % and of halogen free. Aromatic phosphate esters and phosphazene compounds are preferable. Examples thereof include triphenyl phosphate, tricresyl phosphate, trixylenyl phosphate, diphenyl cresyl phosphate, resorcinol bis(diphenyl) phosphate, bisphenol A bis(diphenyl)phosphate, bisphenol A bis(dicresyl)phosphate, resorcinol bis(di-2,6-xylenyl)phosphate, phenoxyphosphazene, methylphenoxyphosphazene, cresylphosphazene, xylenoxyphosphazene, methoxyphosphazene, ethoxyphosphazene, propoxyphosphazene and the like.

When used, the phosphorus flame retardant is added in an amount of 0.1 to 20 parts by weight per 100 parts by weight of the resin.

(5) Auxiliary Flame Retardant:

Auxiliary flame retardants represented by antimony trioxide are known to have a synergistic effect of enhancing the efficacy of brominated flame retardants. The composition according to the present invention may comprise, of course, the auxiliary flame retardant. Examples thereof include antimony trioxide, antimony pentaoxide, tin oxide, tin hydroxide, zinc stannate, zinc stannate hydroxide, molybdenum oxide, ammonium molybdate, zirconium oxide, zirconium hydroxide, zinc borate, zinc metaborate, or barium metaborate. Antimony trioxide is typical.

(6) Tin, Phosphite or Hindered Phenol Stabilizer:

Stabilizers are used for improving heat stability of the flame retarded styrene-based resin composition and thus for preventing shaped articles from coloring. Any commercially available stabilizer may be employed including the following stabilizers.

Tin Stabilizers:
Dibutyltin maleate, dibutyltin dilaurate, dioctyltin dilaurate, and diocytyltin maleate.

Phosphite Stabilizers:
Triphenyl phosphite,
tris(2,4-di-tert-butylphenyl)phosphite,
bis(2,4-di-tert-butylphenyl)pentaerythritol diphosphite,
bis(2,6-di-tert-butylphenyl)pentaerythritol diphosphite,
tetrakis(di-tert-butylphenyl-1,1-biphenyl-4,4-diyl)bis phosphonite, and
bis[2,4-bis(1,1-dimethylethyl)-6-methylphenyl]ethyl phosphite.

Hindered Phenol Stabilizers:
1,6-Hexanediol-bis[3-(3,5-di-tert-butyl)-4-hydroxyphenyl] propionate, triethylene glycol
bis[3-(3-tert-butyl-5-methyl-4-hydroxyphenyl)]-propionate, glycerine
tris[3-(3,5-di-tert-butyl-4-hydroxyphenyl)]propionate, and pentaerythritol
tetrakis[3-(3,5-di-tert-butyl-4-hydroxyphenyl)]-propionate.

These stabilizers may used alone or in combination.

(7) Blowing Agent and Foam Nucleating Agent:

When foamed articles are fabricated from the composition of the present invention, a blowing agent and a foam nucleating agent (foam conditioning agent), all known in the art, are incorporated into the composition. Examples of blowing agents include aliphatic hydrocarbons and halogenated hydrocarbons such as propane, butane, pentane, hexane, 1-chloro-1,1-difluoroethane, monochlorodifluoromethane, monochloro-1,2,2,2-tetrafluoroethane, 1,1-difluoroethane, 1,1,1,2-tetrafluoroethane and 1,1,3,3,3-pentafluoropropane; water, nitrogen or chemical blowing agents such as azo compounds. Examples of foam nuclei agents or foam conditioning agents include talc or bentonite.

(8) Other Additives:

The flame retarded resin composition of the present invention may comprise a variety of other additives which are conventionally incorporated into the styrene-based resin. These include antioxidants, heat stabilizers, UV absorbers, UV stabilizers, impact strength enhancers, pigments, fillers, lubricants, anti-dripping agents, crystalline nucleating agents, antistatic agents, radical initiators and compatibilizers, all being commercially available and described in the manufacturer's catalogs and handbooks on plastic processing technology.

The composition of the present invention may be prepared by the known method. In case of non-foamed solid articles, the styrene-based resin is kneaded under heat with the flame retardant, the metal phthalocyanine and one or more optional additives using a twin screw extruder, Banbury mixer, laboplastomill or hot roll mill, and the resulting blend is shaped by injection molding or compression molding. Various additives may be added to the resin at one time or successively in any order.

In case of foamed products, the blowing agent such as pentane is injected under pressure into molten resin in the extruder (extrusion foaming process). Alternatively, resin premix beads containing additives other than the blowing agent are impregnated with the blowing agent such as pentane to prepare foamable beads.

EXAMPLES

The following Examples and Comparative Examples are offered to illustrate the present invention without limiting the invention thereto. All parts and % are by weight unless otherwise indicated. The materials used in Examples and Comparative Examples are as follows.

A. Styrene-based resin
A1: Polystyrene for general use available from Toyo Styrene Co., under the name of TOYO STYROL G220

A2: Rubber modified high impact polystyrene (HIPS) available from Toyo Styrene Co., Ltd. under the name of TOYO STYROL H650

B. Brominated flame retardant
  B1: Hexabromocyclododecane
  B2: Tetrabromobisphenol A bis(2,3-dibromoisobutyl) ether
  B3: Tetrabromobisphenol A bis(2,3-dibromopropyl)ether
  B4: Tetrabromobisphenol A diallyl ether
  B5: Tris(tribromoneopentyl)phosphate
  B6: Tris(2,3-dibromopropyl)isocyanurate
  B7: 2,4,6-Tris(2,4,6-tribromophenoxy)-1,3,5-triazine
  B8: Decabromodiphenyl ether C. Metal phthalocyanine
  C1: Iron phthalocyanine
  C2: Cobalt phthalocyanine
  C3: Chlorinated iron phthalocyanine
  C4: Copper phthalocyanine (for comparison)

D. Heat stabilizer
  D1: Dioctyltin maleate polymer (tin stabilizer)
  D2: Bis(2,6-di-tert-butylphenyl)pentaerythritol phosphite (phosphite stabilizer)
  D3: Pentaerythritol tetrakis[3-(3,5-di-tert-butyl-4-hydroxyphenyl)]propionate (hindered phenol stabilizer)

E. Blowing agent: pentane

F. Auxiliary flame retardant: antimony trioxide

G. Foam nucleating agent: talc

H. Phosphorus flame retardant; triphenyl phosphate

Examples 1-10 and Comparative Examples 1-10

1. Preparation of Foamed Plastic Specimen

According to the formulation shown in Tables 1-4, various materials other than the blowing agent were fed to a two stage tandem extruder. The materials were heat blended at 200° C. in the first stage extruder having an inner diameter of 65 mm and then, extruded to the second stage extruder having an inner diameter of 90 mm. A predetermined amount of the blowing agent was injected under pressure into the extrudate through a separate line at the forward end of the first stage extruder. The extrudate from the first stage extruder was cooled to 120° C. in the second stage extruder and extruded through a die into a ribbon having a width of 45 mm and a thickness of 2.5 mm.

2. Visual Evaluation of Foamed Extrudate

The state of the resulting extrudate was visually evaluated in accordance with the following criteria.

Good: A foamed extrudate free of cracks or voids is stably obtained.

Not good: The foamed extrudate includes a number of cracks or voids, or stable extrusion is not possible due to blowing of gas from the die.

3. Flame Retardancy Test

Oxygen index (LOI) was determined according to JIS K 7201 standard test.

4. Self-Extinguishability
  Yes=LOI equal to or greater than 26
  No=LOI less than 26

The results are shown in tables 1-4.

TABLE 1

| Material(pbw) | EXAMPLE 1 | 2 | 3 | 4 | 5 |
|---|---|---|---|---|---|
| Resin, A1 | 100 | 100 | 100 | 100 | 100 |
| Brominated flame retardant | B1 | B2 | B3 | B4 | B5 |
|  | 2.0 | 3.0 | 5.0 | 0.5 | 5.0 |
| Metal phthalocyanine | C1 | C1 | C1 | C2 | C1 |
|  | 0.05 | 0.15 | 0.05 | 0.05 | 0.1 |
| Heat stabilizer | — | — | — | — | — |
| Blowing agent, mol/100 g | 0.01 | 0.01 | 0.01 | 0.01 | 0.01 |
| Talc | 1.0 | 1.0 | 1.0 | 1.0 | 1.0 |
| Triphenyl phosphate | — | — | — | — | — |
| Evaluation: |  |  |  |  |  |
| State | Good | Good | Good | Good | Good |
| Flame retardancy, LOI | 26.0 | 27.1 | 26.2 | 26.6 | 26.1 |
| Self-extinguishability | Yes | Yes | Yes | Yes | Yes |

TABLE 2

| Material(pbw) | EXAMPLE 6 | 7 | 8 | 9 | 10 |
|---|---|---|---|---|---|
| Resin, A1 | 100 | 100 | 100 | 100 | 100 |
| Brominated flame retardant | B6 | B2 | B1 | B2 | B1 |
|  | 5.0 | 2.0 | 2.0 | 2.0 | 2.0 |
| Metal phthalocyanine | C1 | C1 | C2 | C1 | C3 |
|  | 0.05 | 0.05 | 0.05 | 0.1 | 0.1 |
| Heat stabilizer | — | — | D3 | D1 | D2 |
|  |  |  | 0.2 | 0.6 | 0.01 |
| Blowing agent, mol/100 g | 0.01 | 0.01 | 0.01 | 0.01 | 0.01 |
| Talc | 1.0 | 1.0 | 1.0 | 1.0 | 1.0 |
| Triphenyl phosphate | — | 1.0 | — | — | — |
| Evaluation: |  |  |  |  |  |
| State | Good | Good | Good | Good | Good |
| Flame retardancy, LOI | 26.3 | 26.1 | 26.4 | 26.2 | 26.5 |
| Self-extinguishability | Yes | Yes | Yes | Yes | Yes |

TABLE 3

| Material(pbw) | COMPARATIVE EXAMPLE 1 | 2 | 3 | 4 | 5 |
|---|---|---|---|---|---|
| Resin, A1 | 100 | 100 | 100 | 100 | 100 |
| Brominated flame retardant | B1 | B2 | B3 | B4 | B5 |
|  | 2.0 | 3.0 | 5.0 | 0.5 | 5.0 |
| Metal phthalocyanine | — | — | — | — | — |
| Heat stabilizer | — | — | — | — | — |
| Blowing agent, mol/100 g | 0.01 | 0.01 | 0.01 | 0.01 | 0.01 |
| Talc | 1.0 | 1.0 | 1.0 | 1.0 | 1.0 |
| Triphenyl phosphate | — | — | — | — | — |
| Evaluation: |  |  |  |  |  |
| State | Good | Good | Good | Good | Good |
| Flame retardancy, LOI | 23.0 | 24.5 | 20.0 | 23.4 | 19.8 |
| Self-extinguishability | No | No | No | No | No |

TABLE 4

| Material(pbw) | COMPARATIVE EXAMMPLE 6 | 7 | 8 | 9 | 10 |
|---|---|---|---|---|---|
| Resin, A1 | 100 | 100 | 100 | 100 | 100 |
| Brominated flame retardant | B6 | B2 | B1 | B1 | B1 |
|  | 5.0 | 2.0 | 2.0 | 5.0 | 2.0 |
| Metal phthalocyanine | — | — | — | — | C4 |
|  |  |  |  |  | 0.05 |
| Heat stabilizer | — | — | D3 | — | — |
|  |  |  | 0.2 |  |  |

TABLE 4-continued

|                         | COMPARATIVE EXAMMPLE |       |       |          |       |
|-------------------------|------|------|------|----------|------|
| Material(pbw)           | 6    | 7    | 8    | 9        | 10   |
| Blowing agent, mol/100 g| 0.01 | 0.01 | 0.01 | 0.01     | 0.01 |
| Talc                    | 1.0  | 1.0  | 1.0  | 1.0      | 1.0  |
| Triphenyl phosphate     | —    | 1.0  | —    | —        | —    |
| Evaluation:             |      |      |      |          |      |
| State                   | Good | Good | Good | Not Good | Good |
| Flame retardancy, LOI   | 19.9 | 23.8 | 23.6 | 25.8     | 23.1 |
| Self-extinguishability  | No   | No   | No   | No       | No   |

The foamed extrudates of Examples 1-10 according to the present invention were all good in the extruded state and exhibited satisfactory flame retardancy. When comparison is made with corresponding Comparative Examples 1-8 free of any metal phthalocyanine, the extrudates of Examples 1-8 exhibited an enhanced flame retardancy suggesting that the metal cyanine used synergistically enhances the flame retardancy of the brominated flame retardant. The extrudate of Comparative Example 9 was inferior to corresponding extrudate of Example 1 in the flame retardancy and thus self-extinguishability although the flame retardant B1 was increased to 5.0 pbw. Furthermore, the extrudate of Comparative Example 9 as extruded included cracks due to decreased heat stability of B1. Comparative Example 10 demonstrates that copper phthalocyanine has no or little effect to enhance the flame retardancy.

Examples 11-22 and Comparative Examples 11-22

1. Preparation of Test Specimen

According to the formulation shown in Tables 5-8, various materials were kneaded at 200° C. for 5 minutes using a hot roll mill and then compression molded at 200° C. for 3 minutes into a plate followed by cutting into a specimen of the predetermined size.

2. Flame Retardancy Test

The vertical combustion method according to UL-94 standard was followed. The size of test specimen was 125 mm in length, 12.5 mm in width and 3.2 mm in thickness. NR indicates not rating.

3. Flexural Strength

According to ASTM-D790, flexural strength and modulus were determined.

The result are shown in Tables 5-8.

TABLE 5

|                     | EXAMPLE |      |      |      |      |      |
|---------------------|------|------|------|------|------|------|
| Material(pbw)       | 11   | 12   | 13   | 14   | 15   | 16   |
| Resin, A2           | 100  | 100  | 100  | 100  | 100  | 100  |
| Brominated flame retardant | B1 | B2 | B3 | B4 | B5 | B6 |
|                     | 2.0  | 3.0  | 5.0  | 0.5  | 5.0  | 5.0  |
| Metal phthalocyanine| C1   | C1   | C1   | C2   | C1   | C1   |
|                     | 0.05 | 0.15 | 0.05 | 0.05 | 0.05 | 0.1  |
| Heat stabilizer     | —    | —    | —    | —    | —    | —    |
| Antimony trioxide   | 1.0  | 1.0  | 1.0  | 1.0  | 1.0  | 1.0  |
| Triphenyl phosphate | —    | —    | —    | —    | —    | —    |
| Flame retardancy (UL-94) | V-2 | V-2 | V-2 | V-2 | V-2 | V-2 |
| Flexural modulus (MPa) | 2050 | 2100 | 2240 | 2020 | 2200 | 2220 |
| Flexural strength (MPa) | 36 | 47 | 42 | 41 | 43 | 44 |

TABLE 6

|                     | EXAMPLE |      |      |      |      |      |
|---------------------|------|------|------|------|------|------|
| Material(pbw)       | 17   | 18   | 19   | 20   | 21   | 22   |
| Resin, A2           | 100  | 100  | 100  | 100  | 100  | 100  |
| Brominated flame retardant | B2 | B1 | B7 | B8 | B1 | B1 |
|                     | 2.0  | 2.0  | 15.0 | 20.0 | 2.0  | 2.0  |
| Metal phthalocyanine| C1   | C2   | C2   | C2   | C1   | C3   |
|                     | 0.05 | 0.05 | 0.05 | 0.05 | 0.1  | 0.1  |
| Heat stabilizer     | —    | D3   | D3   | D3   | D1   | D2   |
|                     |      | 0.2  | 0.2  | 0.2  | 0.5  | 0.01 |
| Antimony trioxide   | 1.0  | 1.0  | 4.0  | 5.0  | 4.0  | 5.0  |
| Triphenyl phosphate | 1.0  | —    | —    | —    | —    | —    |
| Flame retardancy (UL-94) | V-2 | V-2 | V-0 | V-0 | V-0 | V-0 |
| Flexural modulus (MPa) | 2390 | 2100 | 2100 | 2010 | 2080 | 2010 |
| Flexural strength (MPa) | 32 | 45 | 43 | 39 | 39 | 39 |

TABLE 7

|                     | COMPARATIVE EXAMPLE |      |      |      |      |      |
|---------------------|------|------|------|------|------|------|
| Material(pbw)       | 11   | 12   | 13   | 14   | 15   | 16   |
| Resin, A2           | 100  | 100  | 100  | 100  | 100  | 100  |
| Brominated flame retardant | B1 | B2 | B3 | B4 | B5 | B6 |
|                     | 2.0  | 3.0  | 5.0  | 0.5  | 5.0  | 5.0  |
| Metal phthalocyanine | —   | —    | —    | —    | —    | —    |
| Heat stabilizer     | —    | —    | —    | —    | —    | —    |
| Antimony trioxide   | 1.0  | 1.0  | 1.0  | 1.0  | 1.0  | 1.0  |
| Triphenyl phosphate | —    | —    | —    | —    | —    | —    |
| Flame retardancy (UL-94) | NR | NR | NR | NR | NR | NR |
| Flexural modulus (MPa) | 2050 | 2100 | 2250 | 2050 | 2180 | 2190 |
| Flexural strength (MPa) | 39 | 50 | 41 | 45 | 40 | 42 |

TABLE 8

|                     | COMPARATIVE EXAMPLE |      |      |      |      |      |
|---------------------|------|------|------|------|------|------|
| Material(pbw)       | 17   | 18   | 19   | 20   | 21   | 22   |
| Resin, A2           | 100  | 100  | 100  | 100  | 100  | 100  |
| Brominated          | B2   | B1   | B7   | B8   | B1   | B1   |

TABLE 8-continued

| | COMPARATIVE EXAMPLE | | | | | |
|---|---|---|---|---|---|---|
| Material(pbw) | 17 | 18 | 19 | 20 | 21 | 22 |
| flame retardant | 2.0 | 3.0 | 15.0 | 20.0 | 5.0 | 2.0 |
| Metal phthalocyanine | — | — | — | — | — | C4 0.05 |
| Heat stabilizer | — | — | — | — | — | — |
| Antimony trioxide | 1.0 | 1.0 | 4.0 | 5.0 | 1.0 | 1.0 |
| Triphenyl phosphate | 1.0 | — | — | — | — | — |
| Flame retardancy (UL-94) | NR | NR | V-2 | V-2 | V-2 | NR |
| Flexural modulus (MPa) | 2120 | 2050 | 2120 | 2030 | 1700 | 2000 |
| Flexural strength (MPa) | 48 | 46 | 44 | 39 | 20 | 37 |

The shaped specimens of Examples 11-22 all accomplished the flame retardancy UL94 V-2. Specimens of Comparative Examples 11-18 corresponding to Examples 11-18 but not containing any metal phthalocyanine failed to accomplish UL-94 V-2. Comparative Examples 19 and 20 not containing any metal phthalocyanine but containing an increased amount of the flame retardant were inferior in the flame detardancy to otherwise corresponding Examples 19 and 20, respectively. Comparative Example 21 contained an increased amount of the flame retardant and was otherwise identical to Example 21. However, the mechanical properties decreased unsatisfactorily due to the heat stability of the flame retardant used while the desired flame retardancy was achieved. Comparative Example 22 demonstrates that copper phthalocyanine has no or little effect to enhance the flame retardancy.

The invention claimed is:

1. A flame retarded styrene-based resin composition comprising:
   (A) a styrene-based resin,
   (B) 0.1 to 30 parts by weight per 100 parts by weight of the resin (A) of a brominated flame retardant having a bromine content greater than 50 wt %, and
   (C) 0.01 to 0.2 parts by weight per 100 parts by weight of the resin (A) of a phthalocyanine complex of iron or cobalt.

2. A flame retarded styrene-based resin composition according to claim 1, further comprising 0.1 to 20 parts by weight per 100 parts by weight of the resin (A) of a phosphorus flame retardant having a phosphorus content greater than 6 wt %.

3. A shaped article produced from the flame retarded styrene-based resin composition of claim 1.

4. A flame retarded styrene-based resin composition according to claim 1, further comprising a blowing agent.

5. A foamed article produced from the flame retarded styrene-based composition of claim 4.

6. A shaped article produced from the flame retarded styrene-based resin composition of claim 2.

7. A flame retarded styrene-based resin composition according to claim 2, further comprising a blowing agent.

8. A foamed article produced from the flame retarded styrene-based composition of claim 7.

9. A flame retarded styrene-based resin composition according to claim 1 further comprising 0.1 to 20 parts by weight per 100 parts by weight of the resin (A) of a phosphorus flame retardant having a phosphorus content greater than 5 wt %.

10. A flame retarded styrene-based resin composition according to claim 1, wherein said styrene-based resin is a homopolymer or copolymer of styrene, vinyl toluene, or α-methylstyrene.

11. A flame retarded styrene-based resin composition according to claim 1, wherein said brominated flame retardant is:
   hexabromocyclododecane, tetrabromocyclooctane, bis(pentabromophenyl)ethane, bis(2,4,6-tribromophenoxy)ethane, ethylene-bis(tetrabromophathalimide), hexabromobenzene, pentabromotoluene, poly(dibromophenyl)ether, tris(2,3-dibromopropyl)isocyanurate, tribromophenol, tribromophenyl allyl ether, tribromoneopentyl alcohol, tetrabromobisphenol A, tetrabromobisphenol S, tetrabromobisphenol A carbonate oligomer, tetrabromobisphenol A bis(2-hydroxyethyl)ether, tetrabromobisphenol A bis(2,3-dibromopropyl)ether, tetrabromobisphenol A bis(2,3-dibromoisobutyl)ether, tetrabromobisphenol A diallyl ether, tetrabromobisphenol S bis(2,3-dibromopropyl)ether, tetrabromobisphenol A dimethallyl ether, octabromotrimethylphenylindane, poly(pentabromobenzyl acrylate), brominated polystyrene, brominated polyethylene, brominated polycarbonate, perbromocyclopentadecane, tris(2,3-dibromopropyl)phosphate, tris(2,3-dibromochloropropyl)phosphate, tris(tribromoneopentyl)phosphate, or bis(2,3-dibromopropyl)-2,3-dichloropropyl phosphate.

12. A flame retarded styrene-based resin composition according to claim 1, wherein said composition contains 0.5 to 20 parts by weight per 100 parts by weight of the resin (A) of said brominated flame retardant having a bromine content greater than 50 wt %.

13. A flame retarded styrene-based resin composition according to claim 1, wherein said composition contains 1 to 15 parts by weight per 100 parts by weight of the resin (A) of said brominated flame retardant having a bromine content greater than 50 wt %.

14. A flame retarded styrene-based resin composition according to claim 1, wherein said composition contains 0.01 to 0.2 parts by weight per 100 parts by weight of the resin (A) of a phthalocyanine complex of iron.

15. A flame retarded styrene-based resin composition according to claim 1, wherein said composition contains 0.01 to 0.2 parts by weight per 100 parts by weight of the resin (A) of a phthalocyanine complex of cobalt.

16. A flame retarded styrene-based resin composition according to claim 1, wherein said composition contains 0.05 to 0.15 parts by weight per 100 parts by weight of the resin (A) of a phthalocyanine complex of iron or cobalt.

17. A flame retarded styrene-based resin composition according to claim 1, further comprising a phosphorus flame retardant having a phosphorus content greater than 6 wt % and which is halogen free, and the amount of said phosphorus flame retardant is 0.01 to 20 parts by weight per 100 parts by weight of the resin (A).

18. A flame retarded styrene-based resin composition according to claim 17, wherein said phosphorus flame retardant is triphenyl phosphate, tricresyl phosphate, trixylenyl phosphate, diphenyl cresyl phosphate, resorcinol bis(diphenyl) phosphate, bisphenol A bis(diphenyl)phosphate, bisphenol A bis(dicresyl)phosphate, resorcinol bis(di-2,6-xylenyl) phosphate, phenoxyphosphazene, methylphenoxyphosphazene, cresylphosphazene, xylenoxyphosphazene, methoxyphosphazene, ethoxyphosphazene, or propoxyphosphazene.

19. A flame retarded styrene-based resin composition according to claim 1, further comprising an auxiliary flame retardant which is antimony trioxide, antimony pentaoxide, tin oxide, tin hydroxide, zinc stannate, zinc stannate hydroxide, molybdenum oxide, ammonium molybdate, zirconium oxide, zirconium hydroxide, zinc borate, zinc metaborate, or barium metaborate.

20. A flame retarded styrene-based resin composition according to claim 1, wherein said brominated flame retardant is: hexabromocyclododecane, tetrabromobisphenol A bis(2,3-dibromoisobutyl)ether, tetrabromobisphenol A bis(2,3-dibromopropyl)ether, tetrabromobisphenol A diallyl ether, tris(tribromoneopentyl)phosphate, tris(2,3-dibromopropyl)isocyanurate, 2,4,6-Tris(2,4,6-tribromophenoxy)-1,3,5-triazine, or decabromodiphenyl ether.

21. A flame retarded styrene-based resin composition according to claim 1, wherein said styrene-based resin is a high impact polystyrene.

* * * * *